RAPID SWITCHING OF CAPACITANCE

Filed Jan. 25, 1955

WITNESSES:

E. A. McCloskey

Wm. B. Sellers

INVENTOR

Gordon S. Ley.

BY F. E. Browder

ATTORNEY 2,763,807
Patented Sept. 18, 1956

2,763,807

RAPID SWITCHING OF CAPACITANCE

Gordon S. Ley, Plainfield, N. J., assignor to Westinghouse Electric Corporation, East Pittsburgh, Pa., a corporation of Pennsylvania Application January 25, 1955, Serial No. 484,004

5 Claims. (Cl. 315—21)

My invention relates to television receiver circuits and, in particular, relates to circuits for impressing rectangular voltage steps on color-control grids which focus the electron beams of color-television picture tubes on light-emission elements of proper color on their output screens.

In certain types of color television picture tubes, each line of the picture screen comprises a triad of narrow phosphor strips which respectively emit red, green and blue light when struck by electrons of the scanning beam. In reproducing a color picture, the beam is arranged to be deflected away from all except one color strip at any instant by imposing proper potentials on wires of a pair of grids which are positioned parallel to, and just in front of, the color strips. Thus, when one of the pair of grid wires adjacent a triad is, let us say, made 600 volts positive, and the other of the pair is kept at ground potential, the electrons of the scanning beam strikes only the blue-emitting strip. When the wire pairs are both at 300 volts positive, the beam strikes and excites the green-emitting strip; and when the first grid of the pair is switched to ground potential while the second is made 600 volts positive, the beam strikes and excites only the red-emitting phosphor strips. Thus, by successively switching rectangular voltage steps of 600 and 300 volts on the two sets of grid-wire pairs, successive blue, green and red images of the picture line are produced; and this is continued line-by-line down the picture. This may be done by the impression on the first of the pair of grid-wires of a rectangular voltage wave of the form A in Fig. 1, and on the second wire of a rectangular wave like B in that figure. However, the jumps from one voltage step to the next should take place in less than the fly-back or blanking time of the scanning beam between horizontal lines of the picture; i. e., the jumps should take place in less than nine microseconds.

Since there is a pair of grid-wires for each picture line and all of the first wires of the successive pairs are connected together to an inlead, a pair of grids exist on which the stepped waves A and B are respectively impressed, and the grid to grid capacitance, in a picture tube of usual size, is around 1200 micromicrofarads which for some purposes can be considered as a capacitance to ground of 2400 microfarads for each grid. To switch such a grid using video amplifiers of conventional type would require a plate load resistor of less than 2000 ohms, a plate voltage source of around 800 volts supplying direct current of 200 milliamperes and a transmitting tube with a power dissipation of 160 watts.

The principal object of my invention is to provide means for switching such grids as are described above through the voltage steps also described without the expenditure of such large amounts of power, and without the use of such large amplifier tubes, as are required by the above-mentioned system.

Another object is to provide a system for effecting the above-described switching with an arrangement in which high current flows only while rapid voltage change is actually occurring, and in which only about twenty-five watts or less of power is required to switch each grid.

Another object is to provide such a system which draws no plate circuit current between switching operations.

Other objects of my invention will become apparent upon reading the following description taken in connection with the drawings, in which.

Figures 1, 2, 3:
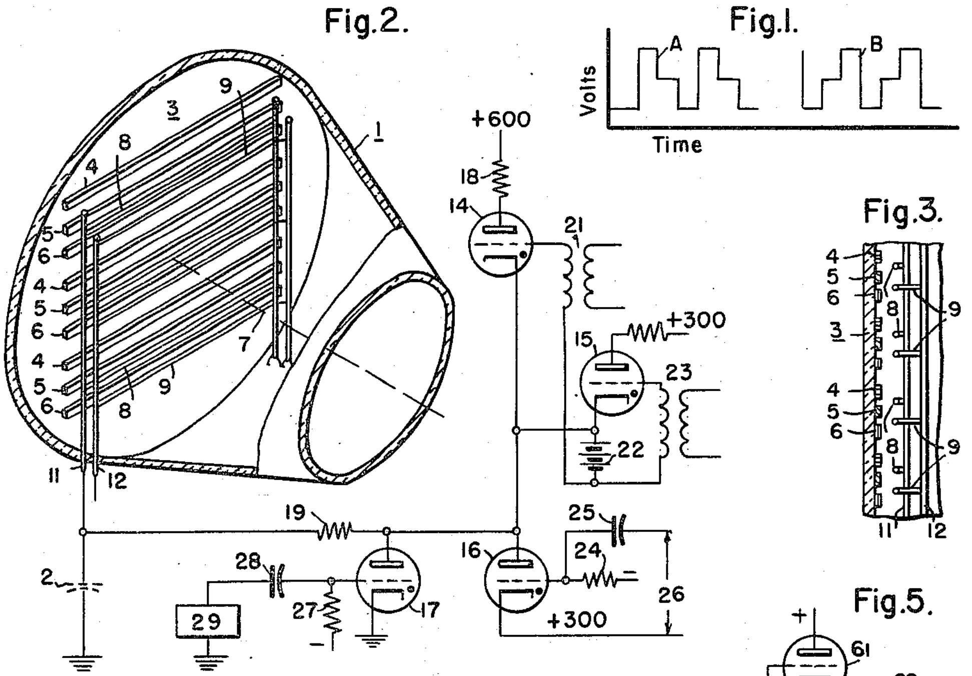
Figure 1 is a graph showing the wave forms of switching voltages already mentioned.
Fig. 2 is a schematic diagram of one type of circuit in which the principles of my invention may be embodied together with a perspective view of the screen end adjacent portions of the picture tube.
Fig. 3 is a schematic view in sectional elevation of part of the screen and control electrode.

Referring to the drawings in detail, it is believed that Fig. 1 has been sufficiently described and that no additional discussion of it is necessary.

In Fig. 2 the capacitance to ground of one scanning beam control screen of a color picture tube 1, such as has been described in the opening paragraphs of this application, is symbolized by the dotted capacitor 2. The picture screen 3 of this tube comprises triads of parallel strips 4, 5 and 6 of phosphor (shown for clarity with greatly expanded dimensions) which respectively fluoresce in blue, green and red light when bombarded by an electron beam 7, which scans them successively from left to right with a fly-back or blanking return stroke in a manner too well known in the television art to require detailed description. In a line-sequential television system, such as is here used to illustrate my invention, the electron beam modulated with the video signals, scans the blue, green and red strips of one triad in order, then moves down to the next lower triad, and so on until the picture has been completed.

The electron beam has a diameter considerably greater than the width of a single phosphor strip, and in order that the beam, when carrying say the blue picture modulation, shall strike only the blue phosphor, a pair of wires 8, 9 is positioned just in front of and parallel to each triad. All the wires 8 are connected together, forming a first grid having an inlead 11, and all the wires 9 are connected together forming a second grid having a second inlead 12. Voltages of the wave forms A and B of Fig. 1 are impressed on inleads 11 and 12 and cause the scanning beam to strike only the blue phosphor strip of a triad during the first third of each period, to strike only the green phosphor during the second third of such period, and only the red phosphor during the final third.

To generate the voltage A impressed on grid-wires 8, I provide four gaseous-discharge tubes 14, 15, 16 and 17. Tube 14 has its anode connected to a source of positive potential (not shown) of 600 volts through a resistor 18. The cathode of tube 14 is connected to the cathode of tube 15, to the anodes of tubes 16 and 17 and through a resistor 19 to the grid-lead 11. The grid of tube 14 is connected through the secondary of a transformer 21 to the negative pole of a bias battery 22 having its positive pole connected to the cathode of tube 14; and the grid of tube 15 is similarly connected to said negative pole through the secondary of a transformer 23. The cathode of tube 16 is connected to the 300 volt positive pole of a voltage source (not shown) which has its negative pole grounded, and the cathode of tube 17 is grounded. The control grid of tube 16 is connected through a resistor 24 to a voltage source (not shown) which biases it negatively to its cathode; and through a blocking capacitor 25 to a source 26 of input signals. The grid of tube 17 is likewise connected through a resistor 27 to a source which biases it negative relative to its cathode, and through a blocking capacitor 28 to a signal source 29.

In line-sequential television systems, signal pulses are available which indicate each change from one color signal to another, and these pulses are impressed on the grids of tubes 14 through 17 in proper sequence to impress voltage wave A of Fig. 1 on the grid-lead 11. To begin with, these tubes are all nonconductive by reason of the negative biases applied to their grids by the above-described bias sources. Thus, when the voltage is to rise from 0 to +600 volts at commencement of the blue color signal, a pulse is impressed on the primary winding of transformer 21 which acts through its secondary to impress a positive pulse on the grid of tube 14 and render it conductive long enough to charge the capacitance to ground of grid-wires 8 (symbolized by capacitor 2) to 600 volts positive. Tube 14 may then return to its non-conductive condition. When the blue picture line of the triad under scansion is completed, a signal pulse is impressed on the grid of tube 16, rendering the latter conductive so that the potential on the grid-wires 8 drops to the 300 volts positive to which its cathode is connected. The grid-wires 8 remain charged to that potential until the end of the green color signal, when a third signal pulse impressed on the grid of tube 17 renders the latter conductive so that the grid-wire capacitance discharges to zero.

The tube 15 is provided so that a voltage wave of the form B of Fig. 1 may be impressed on grid-wires 8 whenever it may be desired to do so. Thus starting with the grid-wire capacitance discharged, a pulse impressed on the primary of transformer 23 renders tube 15 conductive and impresses the 300 volts positive of the source to which its anode is connected on inlead 11 thus charging grid-wires 8 to that potential. After the termination of the green color signal, a pulse is impressed on transformer 21 which renders tube 14 conductive and raises the potential of grid-wires 8 to 600 volts positive. At the end of the red color signal a pulse is impressed on the grid of tube 17 which renders the latter conductive and discharges the capacitance returning grid-wires 8 to zero again.

The tube system 14 to 17 thus gives a circuit by which either of the voltage waves A and B may be impressed on the grid-wires 8 at will. It is believed to be readily evident that voltage waves of opposite polarity to those described above can be produced by reversing the polarities of the tubes 14 through 17 and of the voltage sources impressed on their plate circuits. The inlead 12 to grid-wires 9 may be equipped with a voltage generator of any one of the types just described to impress the desired potentials upon it. In commercial receiver practice, the type of switching wave would be fixed in advance and one of the tubes 15 or 16 would be unnecessary.

Figure 4:
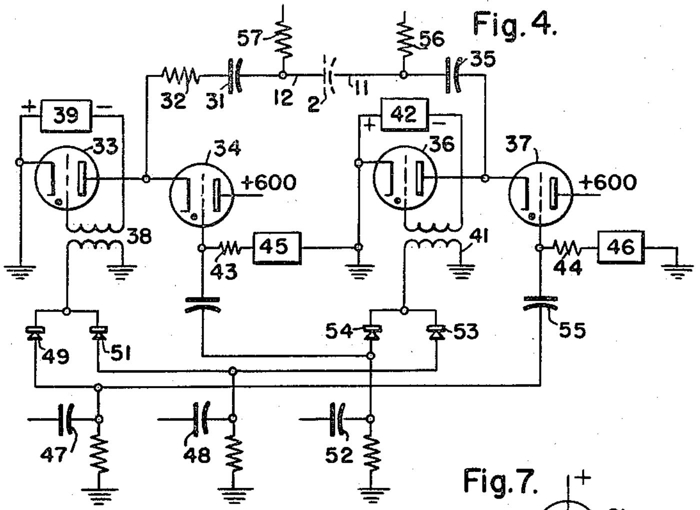
Fig. 4 is a similar diagram of a modification of the Fig. 2 circuit.

Fig. 4 shows a modification of the Fig. 2 circuit which requires only one half the number of control tubes. Thus, the capacitance between the sets of grid-wires 8 and 9 of the picture tube 1 in Fig. 1 is symbolized in Fig. 4 by the dotted capacitor 2, the inlead 12 to grid-wires 9 being connected through a blocking capacitor 31 and resistor 32 to the common terminal of a pair of grid-controlled gaseous-discharge tubes 33, 34 which are connected in cascade from the positive to the grounded negative pole of a 600 volt source (not shown). The inlead 11 to grid-wires 8 is similarly connected through a capacitor 35 to the common terminal of another pair of grid-controlled gaseous-discharge tubes 36, 37 which are connected in cascade from the positive to the grounded negative pole of a second 600 volt source (not shown).

The control grid of tube 33 is connected to its cathode through the secondary winding of a transformer 38 through a negative bias source 39, while the control grid of tube 36 is similarly connected to its cathode through the secondary of a transformer 41 through a negative bias source 42. The control grids of tubes 34 and 37 are connected to ground respectively through resistors 43 and 44 and negative bias sources 45 and 46. The primary of transformer 38 is connected to sources of color change pulse signals 47 and 48, respectively, through diodes 49 and 51. The grid of tube 34 is connected through a blocking capacitor to another source 52 of color-change signals. The primary winding of transformer 41 is connected to color-change pulse sources 48 and 52 through a pair of diodes 53 and 64; and the control grid of tube 37 is connected to the color-change pulse source 47 through a blocking capacitor 55. The inleads 11 and 12 are respectively connected through resistors 56 and 57 to a source of high positive bias potential having its negative pole grounded.

Suppose that, with the arrangement just described, it is desired to impress the voltage wave A of Fig. 1 between the grid-wires 8 and the grid-wires 9 when the blue-color signal pulse arrives. The latter is connected to capacitor 47 to impress a positive voltage pulse on the control electrode of tube 37 and through transformer 38 to make the grid of tube 33 momentarily positive. The diode 51 is so poled that this pulse cannot pass through it to capacitor 48 and the primary of transformer 41. Tubes 33 and 37 are rendered briefly conductive thus connecting the capacitance between grid-wires 8 and grid-wires 9 (symbolized by dotted capacitor 2) across the 600 volt source connected to the anode of tube 37 and charging it to that potential with grid-wires 8 positive.

Now when the color-change signal indicating the time to change from blue to green image arrives, it is impressed through blocking capacitor 48 on the primary circuits of both the transformer 38 and transformer 41, causing the former to render tube 33 conductive and the latter to render tube 36 conductive. The grid-wires 8 and 9 will both be given the potential of ground and the capacitance between them be discharged. When the green picture line has been scanned, the arrival of the color-change pulse at capacitor 52 renders tubes 34 and 36 conductive connecting the grid-wires 9 to the positive voltage source at the anode of tube 34 and the grid-wires 8 to ground through tube 36.

By reversing the polarities of tubes 33, 34, 36 and 37, and grounding the cathodes of tubes 34 and 37, a slightly modified system operative for my above-described purposes is still attained. Also, as another modified form of my invention, the diodes 49, 51, 53, 54 may be replaced by resistors, capacitors or inductors properly proportioned so that the trigger pulse at 47 will not be transmitted to tube 36 with amplitude enough to render it conductive, and the trigger pulse at 52 will not be transmitted to tube 33 with amplitude sufficient to render it conductive, and the trigger pulse at 48 will not be transmitted to tube 34 or 37 with such amplitude as to render them conductive.

Figure 5:
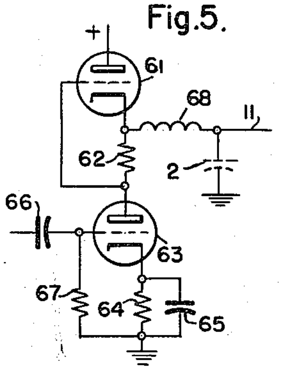
Figs. 5, 6 and 7 are similar diagrams of still other modifications of the Fig. 2 circuit.

Fig. 5 is another circuit capable of impressing the wave forms of Fig. 1 on the grids 8 and 9 of Fig. 2 when color signal voltages are impressed on its control grid. Its circuit comprises a first tube 61 of high-vacuum type having its anode connected to the positive pole of a voltage source having its negative pole grounded, and its cathode connected through a resistor 62 to the anode of a second high-vacuum tube 63, which has its cathode grounded through a second resistor 64 shunted by a capacitor. The color-change signal of wave form like curve A of Fig. 1 is impressed through a capacitor 66 on the control grid of tube 63, the control grid being grounded through a resistor 67. The inlead 11 of Fig. 2 is connected to the cathode of tube 61 through an inductor 68. When color-change signals of the form A in Fig. 1 are impressed through control capacitor 66, a replica of that wave form to larger scale is impressed on the inlead 11 and the capacitance of grid 8, which dotted capacitor 2 symbolizes.

Figure 6:
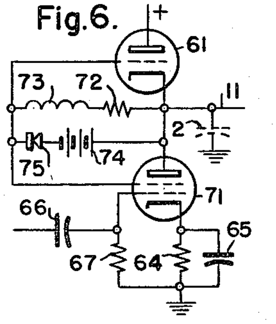

Fig. 6 shows a modification of the Fig. 5 circuit in which the triode 63 is replaced by a multigrid high-vacuum tube 71 having its control grid and cathode connected like those of triode 63, but its anode connected directly to the cathode of high-vacuum tube 61. A resistor 72, inductor 73, bias battery 74 and rectifier 75 are connected in a ring with the anode of the rectifier connected to the negative pole of battery 74. The positive pole of the battery 74 is connected to the anode of tube 71 and the cathode of rectifier 75 is connected to a second grid in tube 71 and to the control-grid of tube 61. The inlead 11 of Fig. 1 is connected to the anode of tube 71, and is impressed with voltages of the form A or B in Fig. 1 when replicas of these voltages are impressed on input capacitor 66 in unison with the color-change signals.

Figure 7:
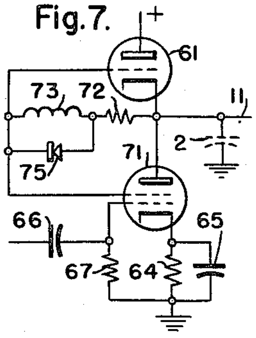

Fig. 7 shows a modification of Fig. 6 which differs from it in that the bias battery 74 is omitted and the rectifier 75 shunts directly across the inductor 73.

While tube 61 has been shown as a triode in Figs. 5, 6 and 7, a pentode or other multigrid tube could replace it, and this would be particularly advantageous in the case of Fig. 6.

I claim as my invention:

1. In combination with a color television picture tube having a pair of color-control grids, a first pair of grid-controlled tubes connected in cascade across a direct current voltage source, a connection from the common terminal of said first pair of tubes to one of said color-control grids, a second pair of grid-controlled tubes connected in cascade across said source, a connection from the common terminal of said second pair of tubes to the other of said color-control grids, a first, a second and a third source of color-change signals, a connection from said first source of color-change signals to the control electrode of one tube of said first pair and through a rectifier to the control electrode of one tube of said second pair, a connection from said second source of color-change signals to the control electrode of the other tube of said second pair and through a rectifier to the control electrode of the other tube of said first pair, and connections through rectifiers from said third source of color-change signals to both said control electrodes to which rectifiers are connected.

2. In combination with a color television picture tube having a pair of color-control grids, a first pair of grid-controlled tubes connected in cascade across a direct current voltage source, a connection from the common terminal of said first pair of tubes to one of said color-control grids, a second pair of grid-controlled tubes connected in cascade across said source, a connection from the common terminal of said second pair of tubes and the other of said color-control grids, a first transformer secondary winding connected between the control-electrode and cathode of one tube of said first pair of grid-controlled tubes, a second transformer secondary winding connected between the control-electrode and cathode of one tube of said second pair of grid-controlled tubes, a first, a second, and a third source of color-change signals, a connection from said first source of color-change signals to the control electrode of the other tube of said first pair of grid-controlled tubes and to a primary winding associated with said second transformer secondary winding, a connection from said second source of color-change signals to the control-electrode of the other tube of said second pair of grid-controlled tubes and to a primary winding associated with said first transformer secondary winding, and connections from said third source of color-change signals to both said primary windings.

3. In combination with a color television picture tube having a color-control grid, a pair of grid-controlled tubes connected in cascade across a direct current voltage source, a connection from the common terminal of said pair of grid-controlled tubes to said color-control grid, a third grid-controlled tube having its anode connected to said color-control grid and its cathode connected to an intermediate point on said voltage source, a first, a second, and a third source of color-change signals, a connection from said first source of color-change signals to one of said pair of grid-controlled tubes, a connection from said second source of color-change signals to the other of said pair of grid-controlled tubes, and a connection from said third source of color-change signals to said third grid-controlled tube.

4. The combination specified in claim 3 in which a fourth grid-controlled tube is connected with opposite polarity across the terminals of said third grid-controlled tube.

5. A voltage-wave source comprising a first pair of grid-controlled tubes connected in cascade across a direct current source, a second pair of grid-controlled tubes connected in cascade across said source, a pair of load terminals connected respectively to the common terminals intermediate in said pairs of grid-controlled tubes, a first transformer secondary winding connected between the control-electrode and cathode of one tube of said first pair of grid-controlled tubes, a second transformer secondary winding connected between the control-electrode and cathode of one tube of said second pair of grid-controlled tubes, a first, a second, and a third source of color-change signals, a connection from said first source of color-change signals to the control electrode of the other tube of said first pair of grid-controlled tubes and to a primary winding associated with said second transformer secondary winding, a connection from said second source of color-change signals to the control-electrode of the other tube of said second pair of grid-controlled tubes and a primary winding associated with said first transformer secondary winding, and connections from said third source of color-change signals to both said primary windings.

References Cited in the file of this patent

UNITED STATES PATENTS

| | | |
|---|---|---|
| 2,464,822 | Mallett | Mar. 22, 1949 |
| 2,689,880 | Hollywood | Sept. 21, 1954 |